(12) United States Patent
Hosoya et al.

(10) Patent No.: US 7,736,682 B2
(45) Date of Patent: *Jun. 15, 2010

(54) PROCESS FOR PRODUCING LOAF BREAD

(75) Inventors: Seio Hosoya, Tokyo (JP); Yuji Yamada, Tokyo (JP)

(73) Assignee: Yamazaki Seipan Kabushiki Kaisha, Tokyo (JP)

( * ) Notice: Subject to any disclaimer, the term of this patent is extended or adjusted under 35 U.S.C. 154(b) by 1159 days.

This patent is subject to a terminal disclaimer.

(21) Appl. No.: 10/545,571

(22) PCT Filed: Feb. 16, 2004

(86) PCT No.: PCT/JP2004/001644

§ 371 (c)(1),
(2), (4) Date: Aug. 16, 2005

(87) PCT Pub. No.: WO2004/071199

PCT Pub. Date: Aug. 26, 2004

(65) Prior Publication Data

US 2006/0078664 A1    Apr. 13, 2006

(30) Foreign Application Priority Data

Feb. 17, 2003 (JP) .............................. 2003-037637
Jul. 28, 2003 (JP) .............................. 2003-280691
Jul. 31, 2003 (JP) .............................. 2003-284348
Sep. 4, 2003 (JP) .............................. 2003-312371

(51) Int. Cl.
    A21D 2/00    (2006.01)

(52) U.S. Cl. ..................... 426/549; 426/496; 426/653

(58) Field of Classification Search ............... None
    See application file for complete search history.

(56) References Cited

U.S. PATENT DOCUMENTS

| | | | |
|---|---|---|---|
| 3,304,183 A | 2/1967 | Johnston et al. | |
| 3,777,038 A | 12/1973 | Thompson | |
| 3,803,292 A | 4/1974 | Bell | |
| 3,882,251 A | 5/1975 | Bell | |
| 3,959,496 A | 5/1976 | Jackel et al. | |
| 5,030,466 A | 7/1991 | Kageyama et al. | |
| 5,505,977 A | 4/1996 | Neumeister | |
| 7,341,755 B2 * | 3/2008 | Hosoya et al. | 426/549 |
| 2004/0161518 A1 | 8/2004 | Hosoya et al. | |

FOREIGN PATENT DOCUMENTS

| | | |
|---|---|---|
| CA | 923755 A1 | 4/1973 |
| GB | 1 103 742 A | 2/1968 |
| GB | 1 247 097 A | 9/1971 |
| GB | 1 299 654 A | 12/1972 |
| GB | 2 264 429 A | 9/1993 |
| JP | 48-88241 | 11/1973 |
| JP | 51 33981 | 9/1976 |
| JP | 52-1052 A | 5/1977 |
| JP | 54052741 A | 4/1979 |
| JP | 55-68231 A | 5/1980 |
| JP | 2-268635 A | 11/1990 |
| JP | 7-083890 A | 3/1995 |
| JP | 08-116857 A | 5/1996 |
| JP | 8-116857 A | 5/1996 |
| JP | 11-103756 A | 4/1999 |
| JP | 3131898 B2 | 11/2000 |

OTHER PUBLICATIONS

T. Cogswell, American Society of Bakery Engineers, Technical Bulletin #240, Oct. 1997.
K. Himata et al., Food Additives and Contaminants, vol. 11, No. 5, pp. 559-569 (1994).
K. Himata et al., Food Additives and Contaminants, vol. 14, No. 8, pp. 809-818 (1997).
E. Jaska et al., Cereal Chemistry, vol. 52, No. 5, pp. 726-738 (1975).
V.A. De Stefanis et al., Cereal Chemistry, vol. 65, No. 3, pp. 257-261 (1988).
Baking Management, May 1997, pp. 42-44.
Milling and Baking News, pp. 19-20, Mar. 18, 1997.
Cereal Foods World, vol. 45, No. 3, pp. 111-120, Mar. 2000.
(Reprint from) "ACS Symposium-Series 816—Bioactive Compounds in Foods: Effects of Processing and Storage," published 2002 by the American Chemical Society, pp. 218-227.
Tadao Uchida, "Shusosan Kariumu ni Kawaru Komugiko Kairyozai", Shokuhin to Kagaku (Shuki special extra issue), Dec. 5, 1982, whole No. 320, pp. 71 to 73.
Baking: Science & Technology, Third Edition, vol. 1., 1988 Sosland Publishing Company, pp. 346-348.

* cited by examiner

*Primary Examiner*—Lien Tran
(74) *Attorney, Agent, or Firm*—Birch, Stewart, Kolasch & Birch, LLP

(57) ABSTRACT

There is disclosed a method for making pullman type breads, which comprises incorporating potassium bromate as an aqueous solution in the step of forming a bread dough in combination with ascorbic acid alone, or alternatively, in combination with ferrous sulfate and ascorbic acid, such that the solubility of the incorporated potassium bromate is increased in the bread dough to facilitate chemical decomposition of bromate, wherein the resulting baked breads of the pullman type are free from residual bromate. The pullman type breads thus prepared are advantageous in that potassium bromate, an excellent bread improver, can be used to provide baked breads free from residual bromate without affecting the flavor and taste of the breads.

15 Claims, No Drawings

PROCESS FOR PRODUCING LOAF BREAD

TECHNICAL FIELD

The present invention relates to a method for making pullman type breads, more specifically, by incorporating potassium bromate as an oxidizing agent into a bread dough, wherein the resulting baked breads are free from residual bromate.

BACKGROUND ART

Potassium bromate has been used worldwide since the 1910s when it was recommended as a bread improver in the United States. In Japan, there is a regulation for use of potassium bromate, stating that "potassium bromate is limited to use for yeast leavened bakery products in an amount of up to 0.03 g (as bromate) per kg of wheat flour (i.e., 30 ppm based on wheat flour) and should be decomposed or removed before completing final products," that is, potassium bromate must not remain in the products after baking.

In conventional techniques, prevention of residual bromate in bakery products has been accomplished, either by using sufficient time for fermentation and baking of a dough to ensure complete chemical reaction of bromate or by incorporating a reduced amount of potassium bromate, or both.

The inventors of the present invention have already developed a method for reduction of residual bromate in bakery products by incorporating ascorbic acid (see, e.g., JP 8-116857 A).

The limitation "bromate should be decomposed or removed" or "bromate must not remain" in the Japanese regulation is intended to mean that bromate should not be detectable when measured by the most sensitive analysis at the time of the measurement, i.e., that bromate is below the detection limit. In view of this limitation, the inventors of the present invention have attempted to incorporate ferrous sulfate in the step of preparing a dough using potassium bromate and have succeeded in reducing residual bromate in bakery products to less than 3 ppb, a non-detectable level as measured by their developed ultra-sensitive HPLC (high performance liquid chromatography) analysis with a detection limit of 3 ppb for bromate in the baked breads (see, e.g., Japanese Patent No. 3131898).

However, the term "free from residual bromate" or "prevention of residual bromate" as used herein is intended to mean that bromate does not remain in an amount of 0.5 ppb or more, the "detection limit for bromate" as measured by further improved state-of-the-art HPLC analysis at the filing of the present invention.

However, the above conventional techniques do not confirm their efficacy for removal or significant reduction of residual bromate in the resulting breads of the pullman type, and particularly do not meet the criterion of less than 0.5 ppb at the filing of the present invention. They also fail to disclose the incorporation of potassium bromate as an aqueous solution. Further, in these conventional techniques, ferrous sulfate is incorporated in an amount of 50 ppm to 370 ppm based on total wheat flour required to prepare a dough, which amount significantly exceeds the range-acceptable for the breads of the present invention to maintain the loaf volume, flavor and taste of breads.

There has been a need to develop a method for making pullman type breads, which allows improvements in the quality of baked breads by incorporating potassium bromate into a bread dough and which provides pullman type breads completely free from the incorporated bromate or with a bromate content reduced to less than 0.5 ppb, the detection limit for bromate.

DISCLOSURE OF THE INVENTION

The inventors of the present invention have found that the above problems associated with conventional techniques can be overcome by incorporating potassium bromate as an aqueous solution in the step of preparing a bread dough, such that the solubility of the incorporated potassium bromate is increased in the bread dough to facilitate chemical decomposition of bromate.

The present invention thus provides the following methods aimed at incorporating potassium bromate as an aqueous solution in the step of preparing a bread dough such that the solubility of the incorporated potassium bromate is increased in the bread dough to facilitate chemical decomposition of bromate. Namely, the present invention provides a method for making pullman type breads by the straight dough process, which comprises:

incorporating potassium bromate as an aqueous solution in the step of forming a bread dough, in combination with ascorbic acid alone, or alternatively, in combination with ferrous sulfate and ascorbic acid to prepare a bread dough; and baking the bread dough in a covered baking pan, wherein the resulting baked breads of the pullman type are free from residual bromate. The present invention also provides a method for making pullman type breads by the sponge and dough process, which comprises:

incorporating potassium bromate as an aqueous solution, in combination with ascorbic acid alone, or alternatively, in combination with ferrous sulfate and ascorbic acid in the step of forming a sponge to prepare a bread dough; and baking the bread dough in a covered baking pan, wherein the resulting baked breads of the pullman type are free from residual bromate.

The present invention further provides a method for making pullman type breads, which allows incorporating a significantly reduced amount of ferrous sulfate or eliminating the incorporation of ferrous sulfate, so that the loaf volume, flavor and taste of baked breads are not affected by ferrous sulfate.

BEST MODE FOR CARRYING OUT THE INVENTION

The present invention is therefore directed to a method for making pullman type breads by the straight dough process, which comprises:

incorporating potassium bromate as an aqueous solution in the step of forming a bread dough, in combination with ascorbic acid alone, or alternatively, in combination with ferrous sulfate and ascorbic acid to prepare a bread dough; and baking the bread dough in a covered baking pan, wherein the resulting baked breads of the pullman type are free from residual bromate. The present invention is also directed to a method for making pullman type breads by the sponge and dough process, which comprises:

incorporating potassium bromate as an aqueous solution, in combination with ascorbic acid alone, or alternatively, in combination with ferrous sulfate and ascorbic acid in the step of forming a sponge to prepare a bread dough; and baking the bread dough in a covered baking pan, wherein the resulting baked breads of the pullman type are free from residual bromate.

In the present invention, in the step of forming a bread dough when using the straight dough process to make pullman type breads or in the step of forming a sponge when using the sponge and dough process to make pullman type breads, it is necessary to incorporate two ingredients, potassium bromate in aqueous solution form and ascorbic acid, or three ingredients, potassium bromate in aqueous solution form, ferrous sulfate and ascorbic acid. In particular, as stated below, the sponge and dough process is desirable to prepare a bread dough. In this case, it is necessary to incorporate two ingredients, potassium bromate in aqueous solution form and ascorbic acid, or three ingredients, potassium bromate in aqueous solution form, ferrous sulfate and ascorbic acid, in the step of forming a sponge. If a bread dough is prepared by the sponge and dough process in the presence of sugars in the sponge, it is necessary to incorporate these three ingredients.

First, potassium bromate is incorporated in the form of an aqueous solution prepared by dissolving powdered potassium bromate in water. Such an aqueous solution may be prepared by simple or ultrasonic stirring of potassium bromate in water or by any other technique for aqueous solution preparation.

For incorporation into a bread dough, potassium bromate should be completely dissolved in water, but may be set to any desired concentration. Potassium bromate has a relatively low and temperature-dependent solubility in water. It has a lower solubility at a lower temperature and its maximum solubility in water at 0° C. is 3%. Water temperature for bread dough preparation is usually higher than 0° C. and potassium bromate can be dissolved in an amount of 3% or more. However, an aqueous solution of potassium bromate preferably has a concentration not higher than 3%, even more preferably not higher than 2%, to avoid precipitation of potassium bromate during bread dough preparation.

On the other hand, with respect to the lower concentration limit for an aqueous solution of potassium bromate, a lower concentration can be advantageous in ensuring a higher solubility and more uniform dispersion of potassium bromate in a bread dough as well as in ensuring more accurate and easier metering of potassium bromate. However, too low a concentration will affect handling and suitability for bread making because there arises a need to incorporate a large volume of such an aqueous solution. For this reason, an aqueous solution of potassium bromate preferably has a concentration not less than 0.1%, even more preferably not less than 1%. The concentration may therefore be adjusted to meet both requirements.

When ascorbic acid is used alone (without ferrous sulfate) to make pullman type breads by the sponge and dough process, an aqueous solution of potassium bromate may usually be incorporated in an amount of 5 ppm to 20 ppm (calculated as potassium bromate) based on total wheat flour required to prepare a bread dough. In contrast, in the case of using both ferrous sulfate and ascorbic acid, potassium bromate may usually be incorporated in an amount of 5 ppm to 25 ppm, preferably 5 ppm to 20 ppm. However, when pullman type breads are made by the sponge and dough process in the presence of sugars in the sponge to shorten the time required for sponge fermentation, the amount of potassium bromate should not exceed 15 ppm; more specifically it is set to, e.g., 5 ppm to 15 ppm. In either case, potassium bromate is more preferably incorporated in an amount of 8 ppm to 15 ppm, and even more preferably 11 ppm to 13 ppm. Likewise, when pullman type breads are made by the straight dough process, potassium bromate may usually be incorporated in an amount of 5 ppm to 15 ppm, more preferably 8 ppm to 15 ppm, and even more preferably 11 ppm to 13 ppm. This allows potassium bromate to sufficiently exhibit its inherent oxidizing effect, thus fully achieving improved bread-making properties, such as improved flavor and mouthfeel of baked breads and improved appearance, including crust color. Further, baked breads of the pullman type can be free from residual bromate by merely incorporating a significantly reduced amount of ascorbic acid or ferrous sulfate.

Too small an amount (e.g., less than 5 ppm) of potassium bromate may fail to achieve the improved bread-making properties mentioned above, while too large an amount (e.g., exceeding 25 ppm in the sponge and dough process) of potassium bromate may also fail to achieve the improved bread-making properties. In the case of too large an amount, it is also necessary to use more time for sponge fermentation and/or to incorporate a larger amount of ascorbic acid or ferrous sulfate in order to ensure prevention of residual bromate in baked breads, particularly in pullman type breads. However, the use of more time for sponge fermentation or a larger amount of ascorbic acid or ferrous sulfate will affect the loaf volume, flavor, taste and crust color of baked breads. Further, there still remains a risk of residual bromate in baked breads even when a larger amount of ascorbic acid or ferrous sulfate is incorporated.

According to the present invention, in addition to potassium bromate in the form of an aqueous solution, ascorbic acid is incorporated alone or together with ferrous sulfate in the step of forming a bread dough when using the straight dough process to make pullman type breads or in the step of forming a sponge when using the sponge and dough process to make pullman type breads. Ascorbic acid as used herein is intended to mean L-ascorbic acid.

When incorporated into a bread dough (including a sponge), ascorbic acid serves as a good improver in relation to the bread dough, while it serves as a reducing agent or its equivalent in relation to potassium bromate to ensure complete chemical reaction of potassium bromate. One aspect of the present invention was in principle completed based on this finding.

Ascorbic acid available for use may be uncoated, partially or completely coated with a fat, or partially or completely coated with a mixture of a fat and an emulsifier such as a mono-glyceride fatty acid ester.

Ascorbic acid incorporated into the bread dough ensures not only greater prevention of residual bromate in baked breads of the pullman type, but also greater improvements in bread-making properties and in the quality of baked breads.

Next, the improvements in bread-making properties and in the quality of baked breads will be explained as follows. Potassium bromate has very narrow optimal ranges for amounts to be incorporated as well as for temperatures and time for fermentation and baking to ensure its sufficient action in a bread dough. However, the addition of ascorbic acid allows these optimal ranges to be extended, easing the conditions for bread making. Although incorporating breads (particularly pullman type breads) with potassium bromate is more likely to cause caving, this phenomenon can also be blocked by addition of ascorbic acid.

In the present invention, a larger amount of ascorbic acid will be desirable in view of ensuring prevention of residual bromate in breads. In contrast, a smaller amount of ascorbic acid will be desirable in view of ensuring improvements in bread-making properties and in the quality of breads by allowing potassium bromate to exhibit its inherent oxidizing effect in a bread dough. The amount of ascorbic acid is not limited to, but usually ranges from 3 ppm to 20 ppm, preferably 3 ppm to 10 ppm, and even more preferably 5 ppm to 10 ppm in view of meeting both requirements.

Ferrous sulfate used in the present invention has the chemical formula $FeSO_4$ and can be available in crystal (7-hydrate) or dry (1- to 1.5-hydrate) form, which are designated as ferrous sulfate (crystal) and ferrous sulfate (dry), respectively. In Japan, ferrous sulfate (crystal) was approved as a food additive in 1957, followed by ferrous sulfate (dry) in 1964. They are collectively referred to as ferrous sulfate.

Ferrous sulfate is prepared from iron and dilute sulfuric acid as follows:

The dry form is prepared by drying the crystal thus prepared at 40° C. to give powder. Although ferrous sulfate as used herein may be in either crystal or dry form, the dry form ($FeSO_4.1-1.5H_2O$) was used in the Examples because of its higher purity.

When incorporated into a bread dough (including a sponge), ferrous sulfate serves as a good iron enrichment in relation to the bread dough, while it serves as a reducing agent or its equivalent in relation to potassium bromate to ensure complete chemical reaction of bromate. One aspect of the present invention was completed in principle based on this finding.

Moreover, the combination of ascorbic acid and ferrous sulfate ensures greater prevention of residual bromate in baked breads of the pullman type. With respect to reduction of residual bromate, the bread dough of the present invention appears to contain $Fe^{3+}$ generated from chemical decomposition of bromate by ferrous sulfate added thereto. However, $Fe^{3+}$ is difficult to chemically react with bromate. Ascorbic acid, when incorporated into the bread dough, will serve as a reducing agent not only to cause direct decomposition of bromate through chemical reaction therewith, but also to indirectly contribute to additional chemical decomposition through conversion of $Fe^{3+}$ present in the bread dough (which is difficult to chemically react with bromate) into $Fe^{2+}$ (which is easy to chemically react with bromate).

Ferrous sulfate may preferably be incorporated in an amount of 0.1 ppm to 20 ppm, more preferably 5 ppm to 16 ppm, and even more preferably 5 ppm to 10 ppm, based on total wheat flour required to prepare a bread dough. On the precondition that potassium bromate is incorporated as an aqueous solution, such an amount of ferrous sulfate successfully ensures prevention of residual bromate in baked breads of the pullman type without affecting bread-making properties or the quality of baked breads. An amount of ferrous sulfate exceeding 16 ppm tends to slightly darken the crumb texture of baked bread. An amount exceeding 20 ppm will affect, to a greater or lesser degree, the loaf volume, flavor and taste of baked breads, depending on bread-making conditions.

Ascorbic acid or ferrous sulfate as used herein is preferably incorporated in powder form, independently of the above aqueous solution of potassium bromate. In the case of using both ferrous sulfate and ascorbic acid, it is more preferable to incorporate both in powder form, independently of the above aqueous solution of potassium bromate. If ferrous sulfate is used as an aqueous solution, the iron ion ($Fe^{2+}$) in ferrous sulfate, capable of reacting with and decomposing bromate, would be affected and hence lose its ability to decompose bromate.

Likewise, if ascorbic acid is incorporated as an aqueous solution, potassium bromate would be decomposed before exhibiting its inherent oxidizing effect in a bread dough, which adversely affects improvements in bread-making properties and in the quality of baked breads.

Ascorbic acid and ferrous sulfate may each be incorporated alone or as a mixture with one or more members selected from yeast foods, enzymes, emulsifiers and other dough conditioners. Preferably, they may be incorporated as a mixture.

In the present invention, the sponge and dough process is desirable to prepare a bread dough. In this case, it is necessary to incorporate two ingredients, potassium bromate in aqueous solution form and ascorbic acid, or three ingredients, potassium bromate in aqueous solution form, ferrous sulfate and ascorbic acid, in the step of forming a sponge. If a bread dough is prepared by the sponge and dough process in the presence of sugars in the sponge, it is necessary to incorporate these three ingredients.

The sponge and dough process refers to a technique for bread dough preparation, which usually involves:

forming a sponge by mixing part of wheat flour required to prepare a bread dough with yeast and water, optionally in combination with one or more members selected from dough conditioners (e.g., yeast foods, oxidants, enzymes), emulsifiers, salt, sugars, and other materials or additives;

fermenting the sponge under given conditions;

making a dough by mixing the fermented sponge with the rest of the wheat flour, salt and water, optionally in combination with one or more members selected from sugars, fats, skimmed milk powder, and other materials or additives; and fermenting (floor time) the dough under given conditions.

In the sponge and dough process according to the present invention, the amount of wheat flour used to form a sponge should be 50% to 80% by mass, preferably 60% to 80% by mass of total wheat flour required to prepare a bread dough. If a larger or smaller amount of wheat flour is used to form a sponge, the resulting bread dough would lack fermentation stability and mechanical tolerance, which are features of the sponge and dough process.

In addition, the mixed sponge may be fermented at a temperature of 26° C. to 29° C., preferably 27° C. to 28° C., for a period of time long enough to ensure sufficient fermentation, for example, but not limited to, 3 to 6 hours, preferably 4 to 5 hours. When sugars such as glucose and sucrose are added in the step of sponge mixing during the sponge and dough process to enhance fermentation and maturation of the sponge, the fermentation time can be set to around 2 to 2.5 hours. However, if the sponge is fermented at a lower temperature or for a shorter period of time, a young sponge would be formed and the resulting bread dough would lack fermentation stability and mechanical tolerance, which are features of the sponge and dough process. Such a young sponge would not only affect the quality of breads, but also give rise to insufficient chemical reaction between potassium bromate and ascorbic acid or among potassium bromate, ferrous sulfate and ascorbic acid. Likewise, if the sponge is fermented at a higher temperature or for a longer period of time, an overfermented old sponge would be formed and the resulting bread dough would also lack the above features of the sponge and dough process and affect the quality of breads.

Thus, the entire process of the present invention requires an extended period of time, from start of mixing (including sponge mixing) to completion of baking, and accordingly a longer period of time will be provided for chemical reaction between potassium bromate and ascorbic acid or among potassium bromate, ferrous sulfate and ascorbic acid, each of which ingredients is incorporated in the step of sponge mixing. As a result, sufficient decomposition of bromate will occur to ensure greater prevention of residual bromate in breads. Incidentally, the sponge and dough process conducted in the presence of sugars in the sponge is widely and commonly used to prepare a sweet bun or sweet bread dough, in which sugars such as glucose and sucrose are added in the step of forming a sponge in an amount of around 2% to 4% by mass of total wheat flour required to prepare a bread dough such that fermentation and maturation of the sponge is enhanced, while the fermentation time is reduced to around 2 to 2.5 hours.

In contrast, the straight dough process (straight process) refers to a technique for bread dough preparation, which usually involves mixing all materials and additives required to prepare a bread dough at one time, followed by fermentation under given conditions. This process uses the same materials and additives to prepare a bread dough as the sponge and dough process uses.

More specifically, the mixed bread dough may be fermented, for example, at a temperature of 26° C. to 29° C., preferably 27° C. to 28° C., for 90 to 150 minutes, preferably 110 to 130 minutes. During this fermentation step, i.e., after about ⅔ to ¾ of the entire fermentation step, the dough is deflated by punching, etc.

In this way, the straight dough process requires a shorter period of time for the entire process, from start of mixing to completion of baking, as compared to the sponge and dough process, and accordingly a shorter period of time will be provided for chemical reaction between potassium bromate and ascorbic acid or among potassium bromate, ascorbic acid and ferrous sulfate, each of which ingredients is incorporated in the step of dough mixing. As a result, bromate is expected to be less decomposed in this process than in the sponge and dough process. However, despite this expectation, the present invention achieves sufficient decomposition of bromate to ensure prevention of residual bromate in baked breads of the pullman type.

The present invention is directed to a method for making pullman type breads, which comprises baking the bread dough prepared by the method for preparing a bread dough discussed above.

The term "pullman type breads" or "breads of the pullman type" as used herein is specifically intended to mean, but is not limited to, square-section breads obtained by baking a bread dough placed in a rectangular baking pan having a square (e.g., foursquare, rectangular) bottom and 4 side walls standing upright from and surrounding the bottom. The bread dough is proofed before baking and covered with a lid during baking.

When used to make pullman type breads, the method of the present invention allows prevention of residual bromate in the resulting baked breads.

As stated above, the present invention can provide pullman type breads free from residual bromate, i.e., those with a bromate content reduced to less than 0.5 ppb, the detection limit for bromate as measured by improved HPLC analysis.

This HPLC analysis, which was developed by the inventors of the present invention as stated above, is an ultra-sensitive high performance liquid chromatography with a detection limit of 0.5 ppb for bromate in breads. Details of this analysis can be found on pages 221-224 of the Journal of the Food Hygienics Society of Japan, Vol. 43, No. 4 (August, 2002); "Analysis of potassium bromate in foods" attached to Notification No. 0304001 of Mar. 4, 2003 delivered from the director of Standards Division, Dept. of Food Safety, Pharmaceutical and Food Safety Bureau, Ministry of Health, Labour and Welfare, Japan; and the corrigenda of Mar. 12, 2003 for "Analysis of potassium bromate in foods" informed by Standards Division, Dept. of Food Safety, Ministry of Health, Labour and Welfare, Japan. This Notification No. 0304001 gave an approval for the detection limit of 0.5 ppb.

EXAMPLES

The present invention will be further described in the following Examples, Comparative Example and Test Example, which are not intended to limit the scope of the invention.

Example 1

Making Pullman Type Bread by Sponge and Dough Process

Potassium bromate in aqueous solution form, ferrous sulfate and ascorbic acid were added in the step of sponge mixing.

The amount of each ingredient is expressed as % by mass or ppm based on total wheat flour (the same applying hereinafter).

(Ingredient Composition)

| | | |
|---|---|---|
| Sponge | Wheat flour (strong flour) | 70% |
| | Yeast | 2% |
| | Dough conditioner (e.g., yeast food, enzyme) including L-ascorbic acid (uncoated) | 0.1% 20 ppm |
| | Emulsifier | 0.3% |
| | Water | 40% |
| | Potassium bromate (as a 1.0% aqueous solution) | 15 ppm |
| | Ferrous sulfate | 15 ppm |
| Dough | Wheat flour (strong flour) | 30% |
| | Sugar | 7% |
| | Fat | 5% |
| | Skimmed milk powder | 2% |
| | Salt | 2% |
| | Water | 28% |

(Process Steps)

| | | |
|---|---|---|
| Sponge | Mixing | Low speed 3 minutes, High speed 2 minutes |
| | Temperature of mixed sponge | 24° C. |
| | Fermentation | 4 hours |
| Dough | Mixing | Low speed 2 minutes, High speed 3 minutes ↓ (add fat) Low speed 2 minutes, High speed 6 minutes |
| | Temperature of mixed dough | 27° C. |
| | Floor time | 20 minutes |
| | Dividing | 500 g |
| | Rounding | |
| | Bench time | 20 minutes |
| | Moulding into M-shape (curl each sheeted dough into a M-shaped roll) | |
| | Panning (place three M-shaped rolls into a baking pan) | |
| | Final proofing | 38° C., 50 minutes |
| | Baking (covered) | 210° C., 33 minutes |

Pullman type bread was made under these conditions. It should be noted that ferrous sulfate and ascorbic acid are each added in powder form, independently of the aqueous solution of potassium bromate (the same applying hereinafter).

(Evaluation)

The content of residual bromate was determined as described in the Journal of the Food Hygienics Society of Japan and the Notification from the Ministry of Health, Labour and Welfare, supra.

(Result)

The bread was evaluated for the content of residual bromate as described above (detection limit: 0.5 ppb), indicating that residual bromate was non-detected (ND, the same applying hereinafter).

This demonstrates that the present invention can provide pullman type bread free from residual bromate when potassium bromate, even in an amount of 15 ppm, is incorporated as an aqueous solution, in combination with ferrous sulfate and ascorbic acid in much smaller amounts than those of the conventional techniques.

The pullman type bread thus prepared also had good loaf volume, flavor and taste which were not affected by ferrous sulfate.

Example 2

Ingredient Composition

The same ingredients as shown in Example 1 were used, except that ascorbic acid was incorporated in an amount of 5 ppm.

(Process Steps)

The same steps as shown in Example 1 were repeated.

(Results)

The pullman type bread thus prepared was evaluated for the content of residual bromate as described above, indicating that residual bromate was ND.

The pullman type bread thus prepared also had good loaf volume, flavor and taste which were not affected by ferrous sulfate.

Example 3

Ingredient Composition

The same ingredients as shown in Example 1 were used, except that potassium bromate and ascorbic acid were incorporated in amounts of 25 ppm and 5 ppm, respectively.

(Process Steps)

The same steps as shown in Example 1 were repeated.

(Results)

The pullman type bread thus prepared was evaluated for the content of residual bromate as described above, indicating that residual bromate was ND.

This demonstrates that the present invention can provide pullman type bread free from residual bromate without affecting the loaf volume, flavor and taste by ferrous sulfate, even when potassium bromate is incorporated in a relatively large amount of 25 ppm.

Examples 4 to 6

Ingredient Composition

The same ingredients as shown in Example 1 were used, except that potassium bromate and ascorbic acid were incorporated in amounts of 12 ppm and 5 ppm, respectively, together with ferrous sulfate in an amount of 5 ppm (Example 4), 10 ppm (Example 5) or 15 ppm (Example 6).

(Process Steps)

The same steps as shown in Example 1 were repeated.

(Results)

The pullman type bread from each example was evaluated for the content of residual bromate as described above, indicating that residual bromate was ND in each case of Examples 4 to 6.

Example 7

Making Pullman Type Bread by Sponge and Dough Process

Potassium bromate in aqueous solution form and ascorbic acid were added in the step of sponge mixing.

(Ingredient Composition)

| | | |
|---|---|---|
| Sponge | Wheat flour (strong flour) | 70% |
| | Yeast | 2% |
| | Dough conditioner (e.g., yeast food, enzyme) | 0.1% |
| | including L-ascorbic acid (uncoated) | 5 ppm |
| | Emulsifier | 0.3% |
| | Water | 40% |
| | Potassium bromate (as a 1.0% aqueous solution) | 13 ppm |
| Dough | Wheat flour (strong flour) | 30% |
| | Sugar | 7% |
| | Fat | 5% |
| | Skimmed milk powder | 2% |
| | Salt | 2% |
| | Water | 28% |

(Process Steps)

| | | |
|---|---|---|
| Sponge | Mixing | Low speed 3 minutes, High speed 2 minutes |
| | Temperature of mixed sponge | 24° C. |
| | Fermentation | 4 hours |
| Dough | Mixing | Low speed 2 minutes, High speed 3 minutes ↓ (add fat) Low speed 2 minutes, High speed 6 minutes |
| | Temperature of mixed dough | 27° C. |
| | Floor time | 20 minutes |
| | Dividing | 500 g |
| | Rounding | |
| | Bench time | 20 minutes |
| | Moulding into M-shape (curl each sheeted dough into a M-shaped roll) | |
| | Panning (place three M-shaped rolls into a baking pan) | |
| | Final proofing | 38° C., 50 minutes |
| | Baking (covered) | 210° C., 33 minutes |

Pullman type bread was made under these conditions.

(Results)

The pullman type bread thus prepared was evaluated for the content of residual bromate as described above, indicating that residual bromate was ND.

Example 8

Ingredient Composition

The same ingredients as shown in Example 7 were used, except that potassium bromate was incorporated in an amount of 15 ppm.

(Process Steps)

The same steps as shown in Example 7 were repeated.

(Results)

The pullman type bread thus prepared was evaluated for the content of residual bromate as described above, indicating that residual bromate was ND.

Example 9

Ingredient Composition

The same ingredients as shown in Example 7 were used, except that potassium bromate and ascorbic acid were incorporated in amounts of 15 ppm and 3 ppm, respectively.

(Process Steps)

The same steps as shown in Example 7 were repeated.

(Results)

The pullman type bread thus prepared was evaluated for the content of residual bromate as described above, indicating that residual bromate was ND.

Example 10

Ingredient Composition

The same ingredients as shown in Example 7 were used, except that potassium bromate was incorporated in an amount of 20 ppm.

(Process Steps)

The same steps as shown in Example 7 were repeated.

(Results)

The pullman type bread thus prepared was evaluated for the content of residual bromate as described above, indicating that residual bromate was ND.

This demonstrates that the present invention can provide pullman type bread free from residual bromate without adding ferrous sulfate, even when potassium bromate is incorporated in a relatively large amount of 20 ppm.

Example 11

Ingredient Composition

The same ingredients as shown in Example 7 were used, except that potassium bromate and ascorbic acid were incorporated in amounts of 20 ppm and 3 ppm, respectively.

(Process Steps)

The same steps as shown in Example 7 were repeated.

(Results)

The pullman type bread thus prepared was evaluated for the content of residual bromate as described above, indicating that residual bromate was ND.

Comparative Example

Next, the content of residual bromate was determined and compared between pullman type breads prepared with and without ferrous sulfate. In this experiment, the comparison was made between pullman type bread prepared using 15 ppm ferrous sulfate (Example 3) and pullman type bread prepared using no ferrous sulfate (Comparative Example), provided that other ingredients and process steps were the same as used in Example 3. The results indicated that residual bromate was ND in Example 3 as stated above, whereas it was 0.5 ppb in this Comparative Example.

This demonstrates that the present invention allows significant reduction of residual bromate in the resulting baked bread of the pullman type by adding ferrous sulfate, when compared to the case of using no ferrous sulfate. The addition of ferrous sulfate is therefore advantageous in cases where potassium bromate is incorporated, e.g., in an amount as large as 20 ppm or more.

Test Example

A test was performed to study effects on bread quality when the amount of potassium bromate was changed in making pullman type bread.

As shown in Table 1 below, bread quality was evaluated for each pullman type bread prepared under the same conditions as used in Example 1, except that potassium bromate was incorporated in an amount of 12 ppm (Example 5), 20 ppm (Example 12) or 25 ppm (Example 13), in combination with ascorbic acid and ferrous sulfate in amounts of 5 ppm and 10 ppm, respectively.

Table 1 shows the results obtained.

TABLE 1

| Ingredient/Quality | Example 5 | Example 12 | Example 13 | Note |
|---|---|---|---|---|
| Potassium bromate(aq) | 12 ppm | 20 ppm | 25 ppm | |
| Ascorbic acid | 5 ppm | 5 ppm | 5 ppm | |
| Ferrous sulfate | 10 ppm | 10 ppm | 10 ppm | |
| Crust color | Good | Good | Good | Not much difference in their crust color |
| Shape | Good | Good | Slightly caved-in*1 | Not much difference in their shape, but tendency to be caved-in with increases in the amount of potassium bromate |

TABLE 1-continued

| Ingredient/Quality | Example 5 | Example 12 | Example 13 | Note |
|---|---|---|---|---|
| Crumb texture | White Fine & uniform | White Slightly rough | White Slightly rough (disruption of lower part of crumb)*3 | Tendency to induce disruption of gluten matrix and to produce large cells with increases in the amount of potassium bromate*2 |
| Mouthfeel | Soft, suitably elastic | Tough | Tough | Tendency to increase toughness of bread crumb and to disturb in-mouth breakdown with increases in the amount of potassium bromate |
| Residual bromate | ND | ND | ND | |

Explanations of the terms used in Table 1 are as follows.
*1"Caved-in" means that the top or side of baked bread is caved in.
*2"To induce disruption of gluten matrix and to produce large cells" means that a rough-textured crumb is formed as a result of non-uniform expansion of bread dough and/or disruption of gluten matrix during the baking step because gluten is more likely to tighten up and less likely to stretch in the presence of a larger amount of potassium bromate, resulting in a tight or hard-to-deflate dough.
*3"disruption of lower part of crumb" means that the phenomena listed in *2 above occur frequently in the lower part of bread.

As is evident from the results shown in Table 1, it was possible to ensure prevention of residual bromate when potassium bromate, even in an amount as large as 25 ppm, was incorporated into a dough for pullman type breads in combination with ascorbic acid and ferrous sulfate. The resulting pullman type breads tend to have a caved-in top and/or side, a rough-textured crumb and a tough mouthfeel, but they are still within a commercially acceptable range. However, a much larger amount of potassium bromate was found to adversely affect the quality of baked pullman type breads.

Examples 14 and 15

Straight Dough Process

Potassium bromate in aqueous solution form and ascorbic acid were added in the step of dough mixing.

(Ingredient Composition)

| Wheat flour (strong flour) | 100.0% |
|---|---|
| Yeast | 2.0% |
| Dough conditioner (e.g., yeast food, enzyme) including L-ascorbic acid (uncoated) | 0.1% |
| | 20 ppm |
| Potassium bromate (as a 1.0% aqueous solution) | 13 ppm (Ex 14) |
| | 15 ppm (Ex 15) |
| Emulsifier | 0.3% |
| Sugar | 7.0% |
| Fat | 5.0% |
| Skimmed milk powder | 2.0% |
| Salt | 2.0% |
| Water | 70.0% |

(Process Steps)

| Mixing | Low speed 4 minutes, High speed 3 minutes ↓ (add fat) Low speed 3 minutes, High speed 6 minutes |
|---|---|
| Temperature of mixed dough | 27° C. |
| Fermentation (punch the dough after 90 minutes and ferment it for an additional 30 minutes) | 25.5° C., 80%, 120 minutes |
| Dividing | 500 g |
| Rounding | |
| Bench time | 20 minutes |
| Moulding into M-shape (curl each sheeted dough into a M-shaped roll) | |
| Panning (place three M-shaped rolls into a baking pan) | |
| Final proofing | 38° C., 50 minutes |
| Baking (covered) | 210° C., 33 minutes |

(Results)

The pullman type bread from each example was evaluated for the content of residual bromate as described above, indicating that residual bromate was ND in each case.

Examples 16 and 17

Straight Dough Process

Potassium bromate in aqueous solution form, ascorbic acid and ferrous sulfate were added in the step of dough mixing.

(Ingredient Composition)

The same ingredients as shown in Example 14 were used, except that ascorbic acid and ferrous sulfate were incorporated in amounts of 5 ppm and 10 ppm, respectively (Example 16). Likewise, the same ingredients as shown in Example 15 were used, except that ascorbic acid and ferrous sulfate were incorporated in amounts of 5 ppm and 10 ppm, respectively (Example 17).

(Process Steps)

The same steps as shown in Examples 14 and 15 were repeated.

(Results)

The pullman type bread from each example was evaluated for the content of residual bromate as described above, indicating that residual bromate was ND in each case.

Examples 18 and 19

Making Pullman Type Bread by Sponge and Dough Process in the Presence of Sugars in the Sponge Potassium bromate in aqueous solution form, ferrous sulfate and ascorbic acid were added in the step of sponge mixing.

(Ingredient Composition)

| | | |
|---|---|---|
| Sponge | Wheat flour (strong flour) | 70% |
| | Yeast | 2% |
| | Glucose | 3% |
| | Dough conditioner (e.g., yeast food) | 0.1% |
| | including L-ascorbic acid (uncoated) | 5 ppm |
| | Emulsifier | 0.3% |
| | Water | 40% |
| | Potassium bromate | 15 ppm |
| | Ferrous sulfate | 10 ppm |
| Dough | Wheat flour (strong flour) | 30% |
| | Sugar | 7% |
| | Fat | 5% |
| | Skimmed milk powder | 2% |
| | Salt | 2% |
| | Water | 28% |

(Process Steps)

| | | |
|---|---|---|
| Sponge | Mixing | Low speed 3 minutes, High speed 2 minutes |
| | Temperature of mixed sponge | 25.5° C. |
| | Fermentation | 27.5° C., 2 hours |
| Dough | Mixing | Low speed 2 minutes, High speed 3 minutes ↓ (add fat) Low speed 2 minutes, High speed 7 minutes |
| | Temperature of mixed dough | 27.5° C. |
| | Floor time | 20 minutes |
| | Dividing | 500 g |
| | Rounding | |
| | Bench time | 20 minutes |
| | Moulding | |
| | Panning | |
| | Final proofing | 38° C., 48 minutes |
| | Baking | 210° C., 33 minutes |

Pullman type bread was made under these conditions.

(Results)

The bread from each example was evaluated for the content of residual bromate as described above, indicating that residual bromate was ND in each case.

This demonstrates that the present invention can provide pullman type bread free from residual bromate by incorporating potassium bromate as an aqueous solution, in combination with the required amounts of ferrous sulfate and ascorbic acid, even when a sponge is fermented for 2 hours in the presence of sugars.

INDUSTRIAL APPLICABILITY

The present invention provides a method for making pullman type breads, which comprises incorporating potassium bromate as an aqueous solution, in combination with ascorbic acid alone, or alternatively, in combination with ferrous sulfate and ascorbic acid, in the step of forming a bread dough or a sponge such that the solubility of the incorporated potassium bromate is increased in the bread dough to facilitate chemical decomposition of bromate, so that the resulting baked breads of the pullman type are free from residual bromate.

According to the present invention, the incorporation of potassium bromate as an aqueous solution allows significant reduction in the amount of ferrous sulfate, if required, so that the loaf volume, flavor and taste of baked breads are not affected by ferrous sulfate. The method of the present invention is widely applicable to making pullman type breads.

The invention claimed is:

1. A method for making pullman type breads by the straight dough process, which comprises:
   incorporating potassium bromate as an aqueous solution, as well as incorporating ascorbic acid in powder form independently of the aqueous solution of potassium bromate in a step of forming a bread dough to prepare a bread dough; and
   baking the bread dough in a covered baking pan to make a pullman type bread,
   wherein the resulting baked breads of the pullman type are free from residual bromate or contain residual bromate at a level below 0.5 ppb, and
   wherein the amounts of said potassium bromate and ascorbic acid are 8-15 ppm and 3-10 ppm, respectively, based on a total wheat flour required to prepare the bread dough.

2. A method for making pullman type breads by the straight dough process, which comprises:
   incorporating potassium bromate as an aqueous solution, as well as incorporating ferrous sulfate and ascorbic acid in powder form independently of the aqueous solution of potassium bromate in a step of forming a bread dough to prepare a bread dough; and
   baking the bread dough in a covered baking pan to make a pullman type bread,
   wherein the resulting baked breads of the pullman type are free from residual bromate or contain residual bromate at a level below 0.5 ppb, and
   wherein the amounts of said potassium bromate, ferrous sulfate and ascorbic acid are 8-15 ppm, 0.1-20 ppm and 3-10 ppm, respectively, based on a total wheat flour required to prepare the bread dough.

3. The method according to claim 1 or 2, wherein the prepared bread dough is fermented for 90-150 minutes before said baking step.

4. The method according to claim 1 or 2, wherein ascorbic acid is partially or completely coated with a fat or a mixture of a fat and a mono-glyceride fatty acid ester.

5. The method according to claim 1 or 2, wherein the prepared bread dough is fermented at a temperature of 26-29° C. before said baking step.

6. A method for making pullman type breads by the sponge and dough process, which comprises:
   incorporating potassium bromate as an aqueous solution, as well as incorporating ascorbic acid in powder form independently of the aqueous solution of potassium bromate in a step of forming a sponge to prepare a bread dough; and
   baking the bread dough in a covered baking pan to make a pullman type bread,
   wherein the resulting baked breads of the pullman type are free from residual bromate or contain residual bromate at a level below 0.5 ppb, and wherein the amounts of said potassium bromate and ascorbic acid are 8-20 ppm and 3-10 ppm, respectively, based on a total wheat flour required to prepare the bread dough.

7. A method for making pullman type breads by the sponge and dough process, which comprises:

incorporating potassium bromate as an aqueous solution, as well as incorporating ferrous sulfate and ascorbic acid in powder form independently of the aqueous solution of potassium bromate in a step of forming a sponge to prepare a bread dough; and baking the bread dough in a covered baking pan to make a pullman type bread, wherein the resulting baked breads of the pullman type are free from residual bromate or contain residual bromate at a level below 0.5 ppb, and wherein the amounts of said potassium bromate, ferrous sulfate and ascorbic acid are 8-25 ppm, 0.1-20 ppm and 3-10 ppm, respectively, based on a total wheat flour required to prepare the bread dough.

8. The method according to claim 6 or 7, wherein ascorbic acid is partially or completely coated with a fat or a mixture of a fat and a mono-glyceride fatty acid ester.

9. The method according to claim 6 or 7, wherein the formed sponge is fermented for 3-6 hours before said baking step.

10. The method according to claim 6 or 7, wherein the formed sponge is fermented at a temperature of 26-29° C. before said baking step.

11. A method for making pullman type breads by the sponge and dough process, which comprises:

incorporating potassium bromate as an aqueous solution, as well as incorporating ferrous sulfate and ascorbic acid in powder form and sugars independently of the aqueous solution of potassium bromate, in a step of forming a sponge to prepare a bread dough; and baking the bread dough in a covered baking pan to make a pullman type bread, wherein the baked bread produced from the bread dough is free from residual bromate or contains residual bromate at a level below 0.5 ppb, and the amounts of said potassium bromate, ferrous sulfate and ascorbic acid are 8-15 ppm, 0.1-20 ppm and 3-10 ppm, respectively, based on the total wheat flour required to prepare the bread dough.

12. The method according to claim 11, wherein the amount of sugars is 2-4% by weight based on total wheat flour required to prepare the bread dough.

13. The method according to claim 11, wherein ascorbic acid is partially or completely coated with a fat or a mixture of a fat and a mono-glyceride fatty acid ester.

14. The method according to claim 11, wherein the formed sponge is fermented for 2-2.5 hours.

15. The method according to claim 11, wherein the formed sponge is fermented at a temperature of 26-29° C.

* * * * *